United States Patent

Flam

[11] 3,894,434
[45] July 15, 1975

[54] RELATIVE HUMIDITY MEASUREMENT

[76] Inventor: Alexander J. Flam, 91 Boulevard de l'Ouest, 93 Le Raincy, France

[22] Filed: Mar. 14, 1973

[21] Appl. No.: 340,962

[30] Foreign Application Priority Data
Mar. 14, 1972 France .................. 72.0875

[52] U.S. Cl. ................. 73/336.5; 73/338; 73/338.3
[51] Int. Cl. ............................................ G01n 25/62
[58] Field of Search ............... 73/336.5, 338.3, 338; 323/75 H, 75 N; 324/65 R

[56] References Cited
UNITED STATES PATENTS
1,956,386    4/1934    Grüss ................................ 73/336.5
FOREIGN PATENTS OR APPLICATIONS
777,817    6/1957    United Kingdom ................ 73/338.3

*Primary Examiner*—S. Clement Swisher
*Assistant Examiner*—Denis E. Corr
*Attorney, Agent, or Firm*—Lane, Aitken, Dunner & Ziems

[57] ABSTRACT

In a bridge circuit providing direct reading of relative humidity, a voltage is produced across a potentiometer corresponding to the difference between ambient temperature and a reference temperature. A galvanometer is connected between the movable tap of the potentiometer and a potential produced by the bridge circuit corresponding to the difference between the wet and dry temperatures. The position of the movable arm of the potentiometer, when the bridge is balanced, directly indicates relative humidity on a scale provided for this purpose.

5 Claims, 2 Drawing Figures

3,894,434

RELATIVE HUMIDITY MEASUREMENT

BACKGROUND OF THE INVENTION

This invention relates to a bridge circuit, the response of which varies as a function of a plurality of variables and, more particularly, to a bridge circuit which provides a direct readout of relative humidity.

There are various methods in the prior art for measuring relative humidity. The psychrometric and dew point methods have been known for a long time. In the psychrometric method, the ambient temperature is measured by a conventional thermometer to give a reading referred to as the dry temperature. A second temperature reading is taken by a thermometer, the sensitive element of which is surrounded by a piece of gauze which is kept moist, and, thus, is cooled by evaporation. This second temperature reading is referred to as the wet temperature. Various tables and curves make it possible from these two temperatures to determine the relative humidity of the ambient air. In other later developed methods, the relative humidity is measured by detecting variations in resistivity or dielectric constant. In most of the methods of the prior art, the result of the measurements must be corrected as a function of the temperature.

SUMMARY OF THE INVENTION

The present invention provides a bridge circuit which provides a direct readout of the relative humidity. In accordance with the present invention, the bridge circuit has three legs, each comprising two resistances connected in series. A potentiometer is connected between the junctions between the resistances of two of the legs and a current detecting means is connected between the movable arm of the potentiometer and the junction between the resistances of the third leg. The first two legs each comprise a fixed resistance and a thermoprobe or thermistor which are arranged so that the bridge circuit produces a voltage across the potentiometer corresponding to the difference between the ambient temperature and a reference temperature with the midpoint of the potentiometer being maintained at a constant potential. The third leg of the bridge circuit contains two thermoprobes connected in series, one of which is maintained moist and is cooled by evaporation. With this arrangement, if the movable arm of the potentiometer is moved until the bridge is balanced, the position of the movable arm of the potentiometer will represent relative humidity which can be read out on an appropriate scale.

The system provides a direct readout indication of the ratio of two variables, one variable being the difference between the ambient temperature and the reference temperature, and the other variable being the difference between the ambient dry temperature and the wet temperature. The bridge circuit can be used in a similar manner to measure the ratio between other variables.

DESCRIPTION OF THE PREFERRED EMBODIMENTS

Figure 1:
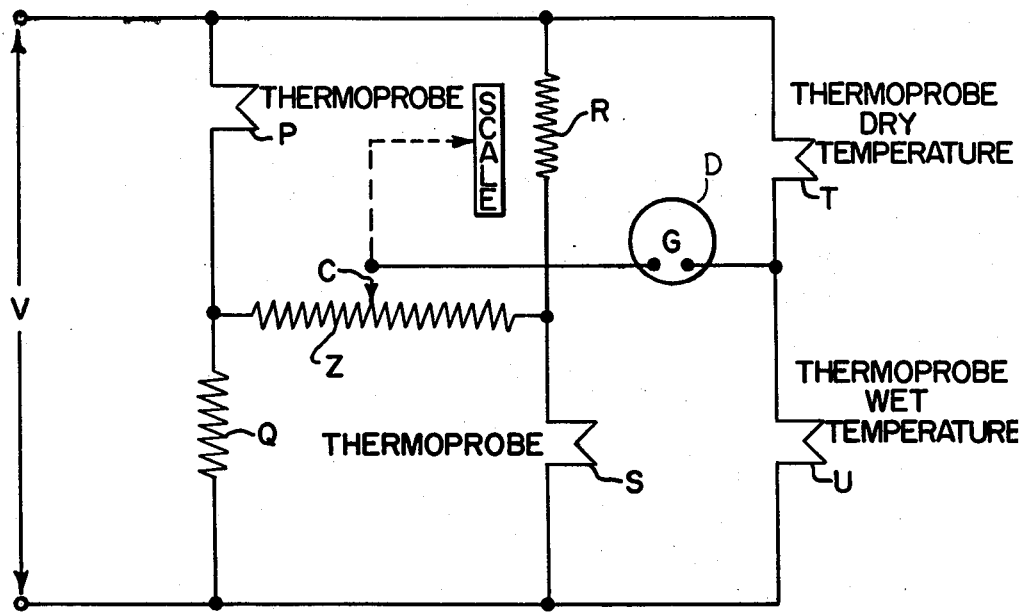
FIG. 1 illustrates the bridge circuit of the present invention.

As shown in FIG. 1, the bridge circuit comprises three legs connected across a source of voltage V. The first leg comprises a platinum resistance thermoprobe P connected in series with a fixed resistance Q. The second leg comprises a fixed resistance R connected in series with a platinum resistance thermoprobe S. A potentiometer Z is connected from the junction between the thermoprobe P and resistance Q to the junction between the resistance R and the thermoprobe S. The third leg of the bridge comprises a platinum resistance thermoprobe T connected in series with a platinum resistance thermoprobe U. A galvanometer D is connected between the movable tap C and the junction between the thermoprobes T and U. The thermoprobes P, S, T and U are thermistors and have resistances which vary with their temperature. The thermoprobes P, S and T are arranged to respond to the ambient temperature. The thermoprobe U is maintained moist so as to be cooled by evaporation to respond to the wet temperature in the conventional manner of psychrometric measurement of relative humidity. The values of the fixed resistances Q and R are selected relative to the resistance values of the thermoprobes P and S so that no current flows through the potentiometer Z when the temperature is at the reference temperature which is about minus 16 degrees centigrade. The thermoprobes have resistances of 100 ohms at zero degrees centigrade. The resistances Q and R have values of 93.75 ohms. Thus, the voltage across the potentiometer Z will vary directly in accordance with the difference between the ambient temperature and the reference temperature. The potential at the midpoint of the potentiometer, however, will not vary, but will remain V/2. Accordingly, the potential at the movable tap of the potentiometer will vary as the product of the displacement of the movable tap from the midpoint times the difference between the ambient temperature and the reference temperature, −16°C. The potential at the movable arm of the potentiometer is proportional to:

$$X(T - T0)$$

in which X is the displacement of the potentiometer tap from the midpoint, T is the ambient temperature and T0 is the reference temperature which is about −16°C.

Since the resistance of the thermoprobe U is cooled by evaporation, the voltage at the junction between the thermoprobes T and U will vary from V/2 in accordance with the difference DT between the dry and wet temperature.

The relative humidity varied directly in accordance with the ratio of DT/(T − T0). When the movable arm of the potentiometer is moved so that the galvanometer shows that the bridge is balanced, the potential at the movable arm of the potentiometer will equal the potential at the junction between the thermoprobes T and U. Accordingly, x will be proportional to the ratio DT/(T − T0). Thus, the displacement of the potentiometer tap from the midpoint will represent relative humidity.

Figure 2:
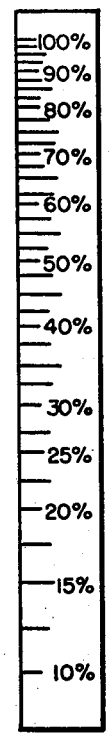
FIG. 2 is an illustration of the scale providing the direct readout of relative humidity from the potentiometer.

A scale is provided coupled with the potentiometer so that the scale pointer moves with the movable tap of the potentiometer. This scale, which is illustrated in FIG. 2, will provide direct reading of relative humidity.

The output signal generated between the movable tap of the potentiometer and the junction between resistances T and U may be used to automatically rebalance the bridge to provide automatic readout. With such atuomatic readout the relative humidity could be continuously recorded.

Instead of measuring relative humidity the bridge circuit may be used to automatically control relative humidity. In such an application, the movable tap of the potentiometer would be set at the desired relative humidity setting and the output signal generated between the movable tap and the junction between the resistance T and the thermoprobe U would be used to control a humidifier or a dehumidifier, or both. The polarity of the output signal will indicate whether the humidity is above or below the desired value. When the humidity is below that desired as indicated by the setting of the potentiometer, the output signal would actuate a control to turn on the humidifier. The control would leave the humidifier on until the output signal indicates that the humidity has been raised to the desired level. Similarly, when the humidity is above that desired as indicated by the setting of the potentiometer, the output signal would actuate control to turn on a dehumidifier until the output signal indicates that the humidity has dropped to the desired value.

Alternatively, the output signal could be used to actuate an alarm to indicate that the humidity has risen above or below a value indicated by the potentiometer setting.

It will be appreciated that the bridge circuit disclosed can be used for providing direct reading of the ratio between other variables. In such applications, the thermoprobes would be replaced by resistances which vary with the variables in the ratio to be measured.

The above description is of a preferred embodiment of the invention and modification thereof may be made without departing from the spirit and scope of the invention, which is defined in the appended claims.

I claim:

1. A system for detecting relative humidity comprising a potentiometer having a movable arm, means to produce a voltage across said potentiometer corresponding to the difference between ambient temperature and a reference temperature, means to produce a voltage corresponding to the decrease in temperature caused by evaporation cooling between a circuit point and a predetermined point on said potentiometer independent of the position of said movable arm, and means to indicate whether electrical balance exists between said movable arm of the potentiometer and said circuit point, said means to produce a voltage across said potentiometer comprising a first resistance varying with temperature connected between one end of said potentiometer and one side of a voltage source, a second resistance varying with temperature connected between the other end of said potentiometer and the other side of said voltage source, a fixed resistance connected between said one end of said potentiometer and said other side of said voltage source and a fixed resistance connected between said other end of said potentiometer and said one side of said voltage source.

2. A system as recited in claim 1, wherein said means to produce a voltage corresponding to the decrease in temperature caused by evaporation cooling comprises a third resistance varying in accordance with the ambient temperature and fourth resistance varying in accordance with its temperature and cooled by evaporation connected in series across said voltage source, a junction between said third and fourth resistances comprising said circuit point.

3. A system as recited in claim 2, wherein a scale is provided to indicate relative humidity by the position of the movable tap of said potentiometer.

4. A system for detecting relative humidity comprising a potentiometer having a movable arm, means to produce a voltage across said potentiometer corresponding to the difference between ambient temperature and a reference temperature, means to produce a voltage corresponding to the decrease in temperature caused by evaporation cooling between a circuit point and the midpoint on said potentiometer independent of the position of said movable arm, and means to indicate whether electrical balance exists between said movable arm of the potentiometer and said midpoint, said means to produce a voltage corresponding to the decrease in temperature caused by evaporation comprising a first resistance varying in accordance with ambient temperature and a second resistance varying in accordance with its temperature and cooled by evaporation cooling, said first and second resistance being connected in series acorss a source of voltage, the junction between said first and second resistance comprising said circuit point, said means to produce a voltage across said potentiometer comprising means to maintain the potential at the midpoint of said potentiometer equal to the midpoint potential of said source of voltage.

5. A system for detecting the ratio between two variables comprising a potentiometer having a movable arm, means for applying a voltage across said potentiometer proportional to one of said variables, means for generating a voltage proportional to the other of said variables between a circuit point and a predetermined point on potentiometer independent of the position of said movable arm, means for indicating whether electrical balance exists between the movable arm of said potentiometer and said circuit point, means for indicating the position of the movable arm of said potentiometer, said means for applying a voltage across said potentiometer comprising a first resistance varying in accordance with one of said variables connected between one end of said potentiometer and one side of a source of voltage, a second resistance varying in accordance with said one of said variables connected between the other end of said potentiometer and the other side of said source of voltage, a fixed resistance connected between said one end of said potentiometer and said other side of said source of voltage, and a fixed resistance connected between said other end of said potentiometer and said one side of source of voltage.

* * * * *